United States Patent

Forbes et al.

(10) Patent No.: US 10,976,718 B2
(45) Date of Patent: Apr. 13, 2021

(54) SYSTEM AND METHOD FOR MONITORING CHANGES IN PROCESS DYNAMIC BEHAVIOR BY MAPPING PARAMETERS TO A LOWER DIMENSIONAL SPACE

(71) Applicant: Honeywell Limited, Mississauga (CA)

(72) Inventors: Michael Forbes, North Vancouver (CA); Johan Backstrom, North Vancouver (CA); Gregory E. Stewart, North Vancouver (CA)

(73) Assignee: Honeywell Limited, Mississauga (CA)

( * ) Notice: Subject to any disclaimer, the term of this patent is extended or adjusted under 35 U.S.C. 154(b) by 34 days.

(21) Appl. No.: 16/294,812

(22) Filed: Mar. 6, 2019

(65) Prior Publication Data

US 2020/0285215 A1   Sep. 10, 2020

(51) Int. Cl.
 *G05B 19/406*  (2006.01)

(52) U.S. Cl.
 CPC .. *G05B 19/406* (2013.01); *G05B 2219/33051* (2013.01)

(58) Field of Classification Search
 CPC ............... G05B 19/406; G05B 2219/33051
 See application file for complete search history.

(56) References Cited

U.S. PATENT DOCUMENTS

| | | | |
|---|---|---|---|
| 7,317,953 B2 | 1/2008 | Wojsznis et al. | |
| 7,551,969 B2 * | 6/2009 | Wojsznis | G05B 11/42 700/31 |
| 8,280,533 B2 | 10/2012 | Wojsznis et al. | |
| 8,489,360 B2 | 7/2013 | Lundeberg et al. | |
| 2005/0060103 A1 * | 3/2005 | Chamness | G05B 23/024 702/30 |
| 2008/0053240 A1 * | 3/2008 | Henry | G01F 15/024 73/861.04 |
| 2008/0082297 A1 * | 4/2008 | Lundeberg | G05B 23/024 702/183 |
| 2009/0319060 A1 * | 12/2009 | Wojsznis | G05B 17/02 700/30 |
| 2015/0019154 A1 * | 1/2015 | Usami | G06F 12/1416 702/100 |

* cited by examiner

*Primary Examiner* — Ziaul Karim
(74) *Attorney, Agent, or Firm* — Paschall & Associates LLC; James C. Paschall

(57) ABSTRACT

A method includes acquiring process data collected in an industrial process control and automation system. The method also includes reducing a dimension space of the process data by combining two or more parameters of the process data or examining a frequency response of the process data. The method further includes determining a change in a process based on a change in the process data in the reduced dimension space. The method also includes outputting a result based on the determined change in the process.

17 Claims, 6 Drawing Sheets

_US 10,976,718 B2_

SYSTEM AND METHOD FOR MONITORING CHANGES IN PROCESS DYNAMIC BEHAVIOR BY MAPPING PARAMETERS TO A LOWER DIMENSIONAL SPACE

TECHNICAL FIELD

This disclosure relates generally to industrial process control and automation systems. More specifically, this disclosure relates to a system and method for monitoring changes in process dynamic behavior by mapping parameters to a lower dimensional space.

BACKGROUND

Industrial process control and automation systems are often used to automate large and complex industrial processes. These types of systems routinely include sensors, actuators, and controllers. Some of the controllers typically receive measurements from the sensors and generate control signals for the actuators. Other controllers often perform higher-level functions, such as planning, scheduling, and optimization operations.

The quality of products produced in industrial processes typically depends strongly on having the automatic control system for the process operating well. Most automatic control loops or multivariable controllers have tuning parameters that are adjusted to the dynamic behavior of the process. When these are adjusted correctly, the controller takes good actions, the process is well controlled and high quality products result. However, should the dynamic behavior of the process change, the controller may need to be re-tuned to avoid a degradation of control performance and consequent poor quality production.

SUMMARY

This disclosure provides a system and method for monitoring changes in process dynamic behavior by mapping parameters to a lower dimensional space.

In a first embodiment, a method includes acquiring process data collected in an industrial process control and automation system. The method also includes reducing a dimension space of the process data by combining two or more parameters of the process data or examining a frequency response of the process data. The method further includes determining a change in a process based on a change in the process data in the reduced dimension space. The method also includes outputting a result based on the determined change in the process.

In a second embodiment, an apparatus includes at least one processing device. The at least one processing device is configured to acquire process data collected in an industrial process control and automation system; reduce a dimension space of the process data by combining two or more parameters of the process data or examining a frequency response of the process data; determine a change in a process based on a change in the process data in the reduced dimension space; and output a result based on the determined change in the process.

In a third embodiment, a non-transitory computer readable medium contains instructions that when executed cause at least one processing device to acquire process data collected in an industrial process control and automation system; reduce a dimension space of the process data by combining two or more parameters of the process data or examining a frequency response of the process data; determine a change in a process based on a change in the process data in the reduced dimension space; and output a result based on the determined change in the process.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures discussed below and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
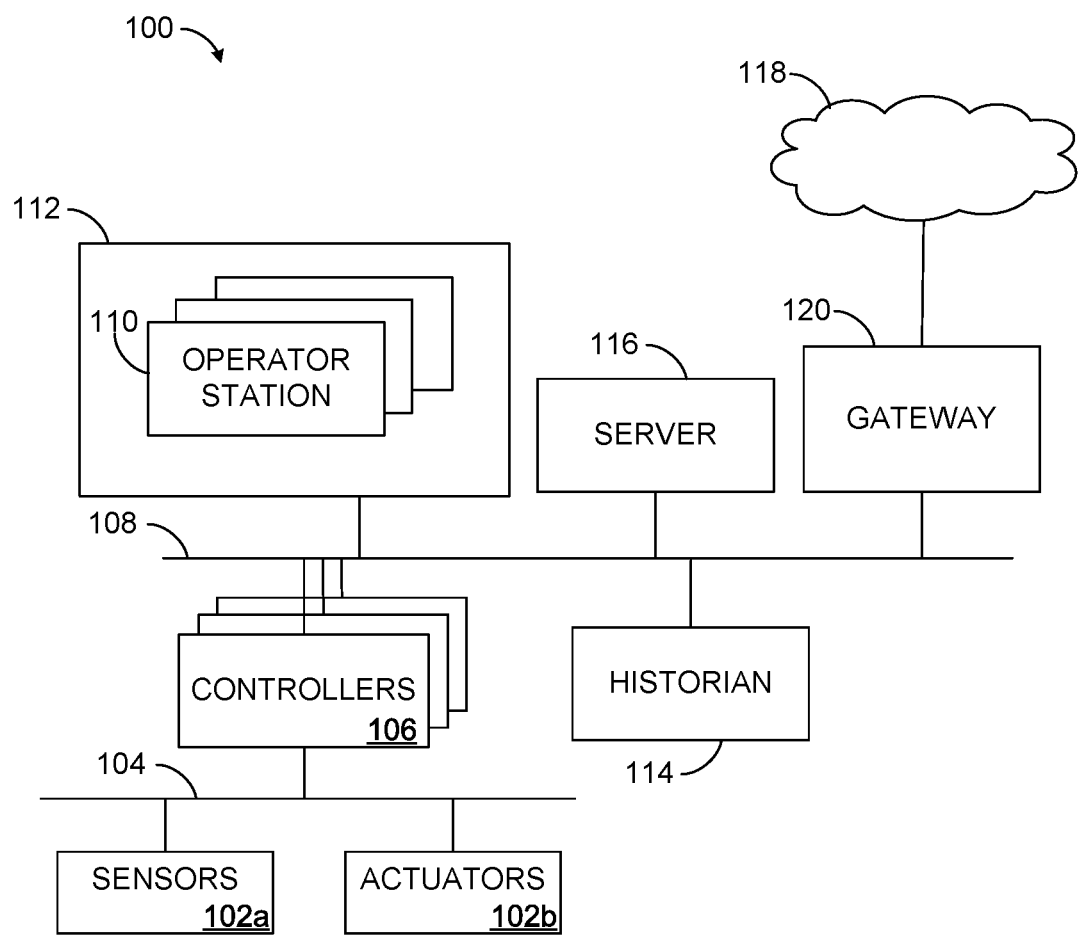
FIG. 1 illustrates an example industrial process control automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as pressure, temperature, or flow rate. Also, the actuators 102b could alter a wide variety of characteristics in the process system. Each of the sensors 102a includes any suitable structure for measuring one or more characteristics in a process system, Each of the actuators 102b includes any suitable structure for operating on or affecting one or more conditions in a process system.

At least one network 104 is coupled to the sensors 102a and actuators 102b, The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network, electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control or other advanced predictive control. As a particular example, each controller 106 could represent a computing device running a real-time operating system, a WINDOWS operating system, or other operating system.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and alarms associated with the industrial process. Each operator console 110 could also receive information affecting how the industrial process is controlled, such as by receiving setpoints or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a to single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system. Note that while shown as being local within the control and automation system 100, the functionality of the server 116, the historian 114, or both, could be remote from the control and automation system 100. For instance, the functionality of the server 116 and/or the historian 114 could be implemented in a computing cloud 118 or a remote server communicatively coupled to the control and automation system 100 via a gateway 120.

In general, the quality of products produced in industrial processes typically depends strongly on having the automatic control system for the process operating well. Most automatic control loops or multivariable controllers have tuning parameters that are adjusted to the dynamic behavior of the process. When these are adjusted correctly, the controller takes good actions, the process is well controlled and high quality products result. However, should the dynamic behavior of the process change, the controller may need to be re-tuned to avoid a degradation of control performance and consequent poor quality production.

The behavior and operation of industrial process control and automation systems, such as the system 100, can be modelled using one or more process models. Accurate process models may be beneficial or required for many reasons. For example, a process model may be used to make predictions about a process or for tuning a controller. It is often a difficult problem to determine when process behavior has changed significantly. For many industrial processes, process model parameters are estimated from data, and the data used in the estimation typically comes from a planned experiment designed to create information rich data. If the process changes over time, it may be necessary to re-identify the process model. However, planned experiments can be time consuming and may risk product quality. Therefore, there is a strong motivation to be able to determine when process behavior to has changed, so that experiments can be performed only when necessary.

Some process behavior monitoring techniques involve periodic estimation of process model parameters based on routine process data. These parameter estimates are monitored over time, and when significant deviations from nominal values are detected, it is concluded that process behavior has changed. However, when process data is noisy, the model parameter estimates may also be noisy. When there are multiple parameters, the variability of the estimates can make it difficult to determine when there have been significant shifts in values. In general the more parameters there are, the harder it can be to detect changes.

To address these and other issues, embodiments of this disclosure provide a system and method for monitoring changes in process dynamic behavior by mapping parameters to a lower dimensional space. The disclosed embodiments take into account that, when there is correlation between parameters, dimensional reduction can be used to make shifts in behavior easier to detect. For this reason, the dimension of the parameter space is reduced to simplify the task of detecting a deviation from nominal values. The disclosed embodiments employ one or more techniques to determine when process behavior has changed by monitoring process model parameter estimates in a lower dimensional space.

Multiple techniques of parameter space reduction can be used. In a first technique, the time delay and time constant parameters can be added together to create a resulting combined response time parameter. This combined parameter has been found to be less variable than the individual parameters. In a second technique, the frequency response of the process models can be examined. One may look at the gain and phase shift at a key frequency, such as the cut-off frequency of the nominal model. This reduces the parameter space to two parameters that can be monitored over time. Using either of these techniques, the parameter space of the models is reduced to two parameters that are less noisy. In some embodiments, one or more of the components in FIG. 1 (such as the operator consoles 110, the historian 114, the server 116, or the computing cloud 118) could be configured to perform these operations.

The disclosed embodiments result in having fewer and more stable parameters for monitoring, which makes the monitoring easier and more likely to detect changes in process behavior. Once a change in process behavior is detected, human or automatic intervention can be triggered to undertake a plant experiment to generate a more accurate process model for controller retuning and maintenance of good process control. These benefits represent a technical advantage over conventional systems in which noisy data hides changes in process behavior. Additional details regarding the disclosed embodiments are provided below.

Although FIG. 1 illustrates one example of an industrial process control and automation system 100, various changes may be made to FIG. 1. For example, the system 100 could include any number of sensors, actuators, controllers, networks, operator stations, control rooms, historians, servers, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment in which changes in process dynamic behavior can be monitored by mapping parameters to a lower dimensional space. This functionality can be used in any other suitable system.

The first and second techniques discussed above will now be described in greater detail.

Technique 1: Using process response time to represent higher order process dynamics.

In the first technique, process response time may be used to represent higher order process dynamics. Process response time can be defined as the time it takes for a process step response to reach 63.2% of its final value. In the case of first-order plus deadtime models, process response time is the sum of the time constant and the time delay. In the case of higher order models, the step response can be simulated to determine the process response time. In particular, the higher order model can be reduced to the response time.

A process P may be modeled by, for example, a linear system of differential equations, which can be written in Laplace transfer function form as:

$$y = P_1 u_1 + P_2 u_2 + \ldots + P_m u_m \quad (1)$$

where y is the process output, m is the number of process inputs, $u_i$ is the $i^{th}$ process input, each $P_i$ takes the form $$P_i = \frac{b_i(s) e^{-d_i s}}{f_i(s)} \quad (2)$$

and $b_i$ and $f_i$ are polynomials in s, the Laplace domain variable, and $d_i$ is a pure time delay.

First-order plus deadtime transfer functions are simple, but powerful, models that can be used to describe many industrial processes well enough for the purposes of controller design. A first-order plus deadtime transfer function is a specific form of Equation (2) and takes the form:

$$P_i = \frac{k_i e^{-d_i s}}{\tau_i s + 1} \quad (3)$$

where $k_i$ is the process gain and $\tau_i$ is the process time constant.

Figure 2:
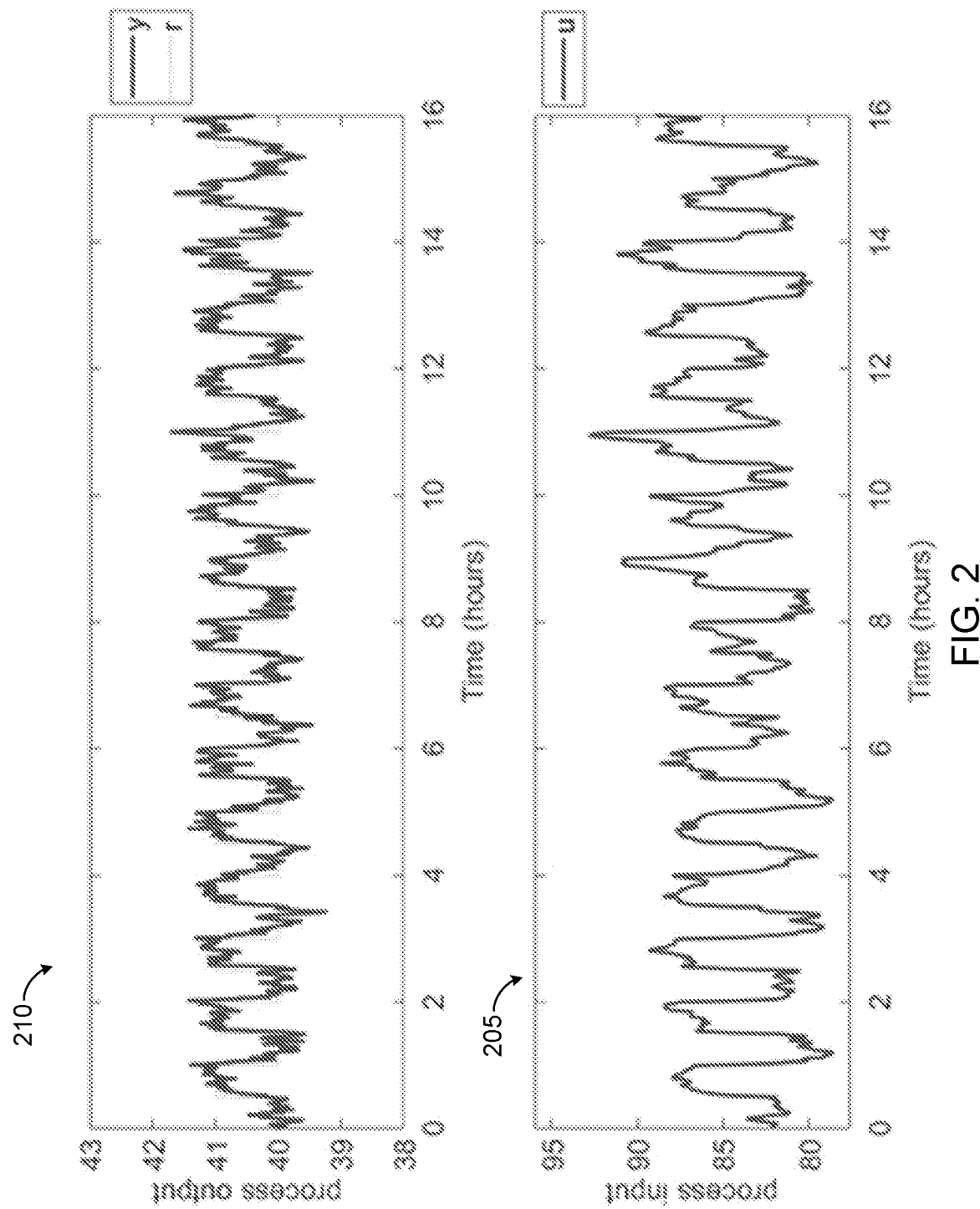
FIG. 2 illustrates charts showing an example of routine process data for a single-input single-output system, according to this disclosure.

One way to obtain process models is from process model identification based on process data. FIG. 2 illustrates charts 205, 210 showing an example of routine process data for a single-input single-output system, according to this disclosure. As shown in FIG. 2, the chart 205 shows the process input u over time for the example system. The chart 210 shows the process output y over time for the system. The other plot in the chart 210 shows r over time, where r is the target output or set point.

When estimating the parameters for a process model, an optimization such as the following may be performed:

$$\theta^* = \underset{\theta}{\operatorname{argmin}} \sum_{i=1}^{N} (y(i) - y_\theta(i))^2 \quad (4)$$

where y(i) are the measured process values, $y_\theta(i)$ are the predictions based on the model with parameters θ, and N is the number of data points.

This optimization finds the process model parameter values that minimize the sum of squares of errors between the measured process values and the values predicted by the process model. Techniques for process model parameter estimation are well-known and will not be described in further detail herein.

If information rich data is available (for example, data from a planned plant experiment), then it is possible to obtain accurate process model parameter estimates. Typically, data from routine process operations is not information rich, and so process model parameter estimates from routine operating data tend to have large variances and other potential inaccuracies. However, while the routine process data may not allow accurate process model estimation, if process model parameters are periodically re-estimated, changes in process behavior may be detected as a shift in the estimates.

The objective is to monitor parameter estimates made from routine operating data and to look for changes. For example, consider the case of a paper mill that has a process for producing paper. One of the most important parameters is that the produced paper have the right basis weight. To adjust the basis weight of the paper, one method is to adjust a stock flow valve at the headbox. This can be represented by three parameters: gain, time delay, and time constant.

An example of gain is, if the stock flow valve is opened x amount, the weight of the paper changes by y amount. In a simplified example, the gain could be y/x. The time delay indicates how long after the stock flow valve is adjusted that any change in the weight of the paper occurs. The time constant measures a "ramp time" of a gradual change; that is, the time constant indicates how long from when a change is first measured until a new steady state value is measured. In the case of the paper mill, the time constant may indicate how long it takes, after adding more stock to the headbox, for the concentration in the headbox to increase from a previous steady state value to a new steady state value.

For first-order plus deadtime models, both the time constant and time delay affect the speed of the process response, and there can be a correlation between the estimates of these parameters. For example, the time constant and time delay tend to move in opposite directions. For this reason, it can be advantageous to simply add these two parameters together and monitor the sum, which is typically a more stable parameter. It should be noted that for first order plus time delay processes, the sum of time constant plus time delay is the 63.2% process response time. This technique can also be generalized to higher order processes. A simple method is to simulate the step response to determine the process response time.

This can be viewed as a dimension reduction technique in that, using to this technique, one may monitor the two parameters, gain and response time, to detect changes in process behavior, as opposed to monitoring gain, time constant, and time delay, or an even larger number of parameters depending on the process model order. There are many other techniques of dimensional reduction that may be used for this problem.

Technique 2: Using phase at model cutoff frequency to represent process dynamics.

The second process model parameter dimensional reduction technique for monitoring for changes in process behavior is to look at the frequency response of the process model. The frequency response of the process model, as represented by a Bode plot, shows the process gain and phase as a function of frequency.

Bode plots are derived as follows. For a process model in transfer function form, such as in Equation (2) above, $P_i(j\omega)$ is obtained by substituting $s=j\omega$. The polar form of this complex valued function is:

$$P_i(j\omega)=|P_i(j\omega)|e^{-\varphi ij} \quad (5)$$

where $|P_i(j\omega)|$ is the amplitude ratio and $\varphi_i$ is the phase angle as functions of $\omega$. A Bode plot is simply a plot of these two functions. Bode plats and frequency domain analysis are well-established fields and further details will not be included herein.

Figure 3:
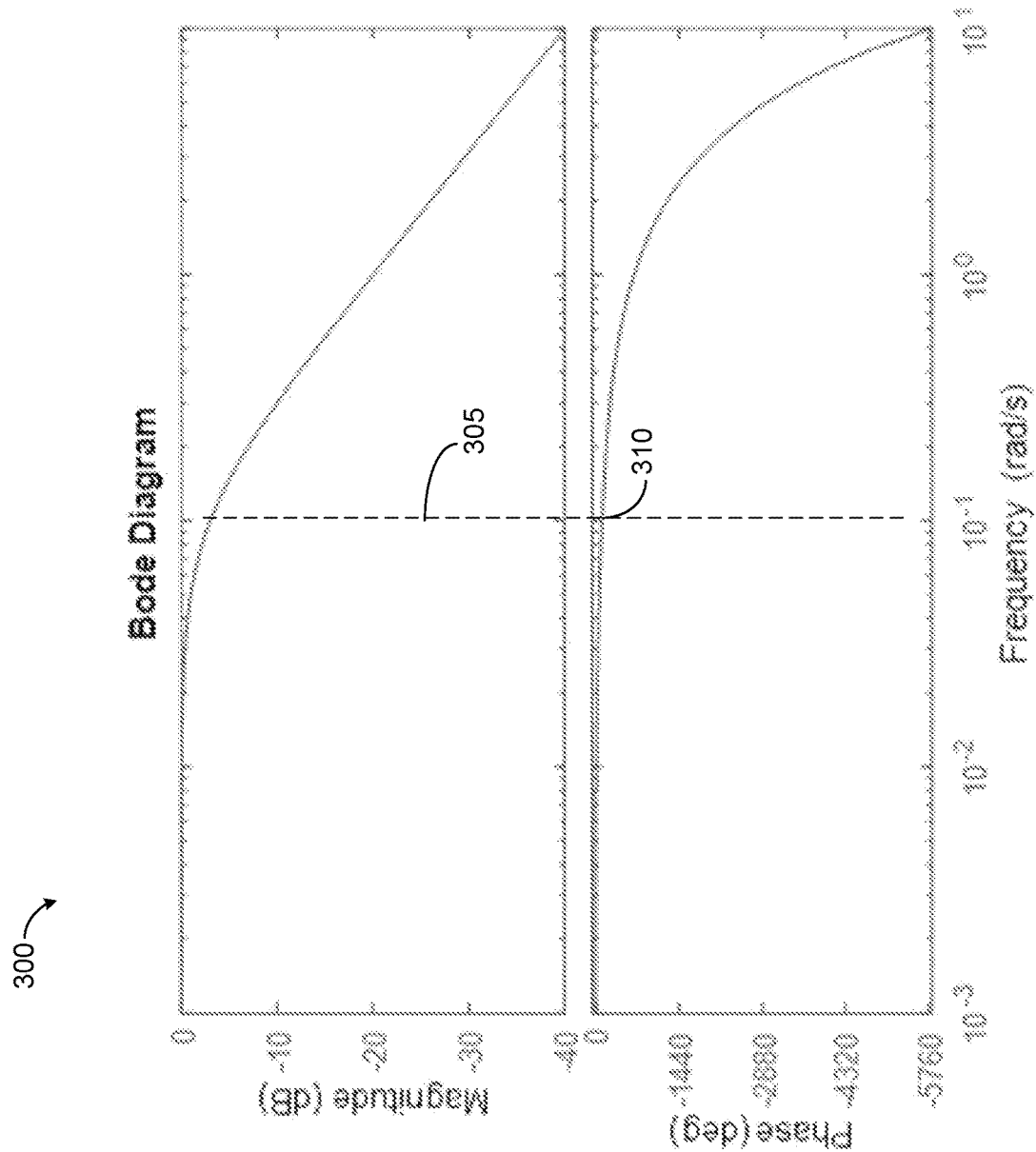
FIG. 3 illustrates an example Bode plot according to this disclosure.

FIG. 3 illustrates an example Bode plot 300 according to this disclosure. From examination of the Bode plot 300, a cutoff frequency 305 and a phase 310 at the cutoff frequency may be determined. The cutoff frequency 305 is determined by finding the frequency at which the amplitude ratio is equal to 0.707, or −3 if the magnitude is expressed in decibels. The phase 310 at the cutoff frequency 305 is simply the value of the phase at the cutoff frequency. In the Bode plot 300, the cutoff frequency 305 is roughly 0.1 rad/s and the phase 310 at that frequency is roughly −100 degrees. No matter the order of the polynomials making up the transfer function in Equation (2), the model may be summarized by the Bode plot 300. The phase plot is associated with the dynamics of the model and large changes in the phase, particularly around the cutoff frequency may be associated with important changes in the process dynamics.

For this reason, the phase at the cutoff frequency may be used to represent the dynamics of the process model, regardless of the order of the process model, for monitoring for changes in the process behavior. To be clear, if a series of models are being compared, then the frequency of interest can be chosen as the cutoff frequency for the nominal model. The dynamics of subsequent models can then be summarized by their gain, and by their phase at the frequency of interest (the cutoff frequency of the nominal model).

Instead of monitoring all individual parameters associated with the process dynamics, one may monitor the phase at a key frequency, such as the cutoff frequency of the nominal model. This is demonstrated in the example below.

Consider the routine process data as shown in FIG. 2, To monitor this process, process model parameter estimates could be made periodically, such as every 30 minutes. Then, each time 30 minutes is elapsed, the most recent window of data, for example the last four hours, can be used to estimate the process model parameters. The parameter estimates may then be transformed to a reduced dimensional space. For example, the response time of the model could be calculated, or the phase at the cutoff frequency of the nominal model could be calculated. The reduced dimensional estimates can then be monitored over time, and shifts in values beyond thresholds around the nominal value indicate one or more changes in process behavior.

When it is determined that process behavior has changed, then excitation (e.g., one or more disturbances, perturbations, etc.) can be added to the process to generate an information rich data set so that an accurate model of the new process behavior may be obtained.

Figure 4:
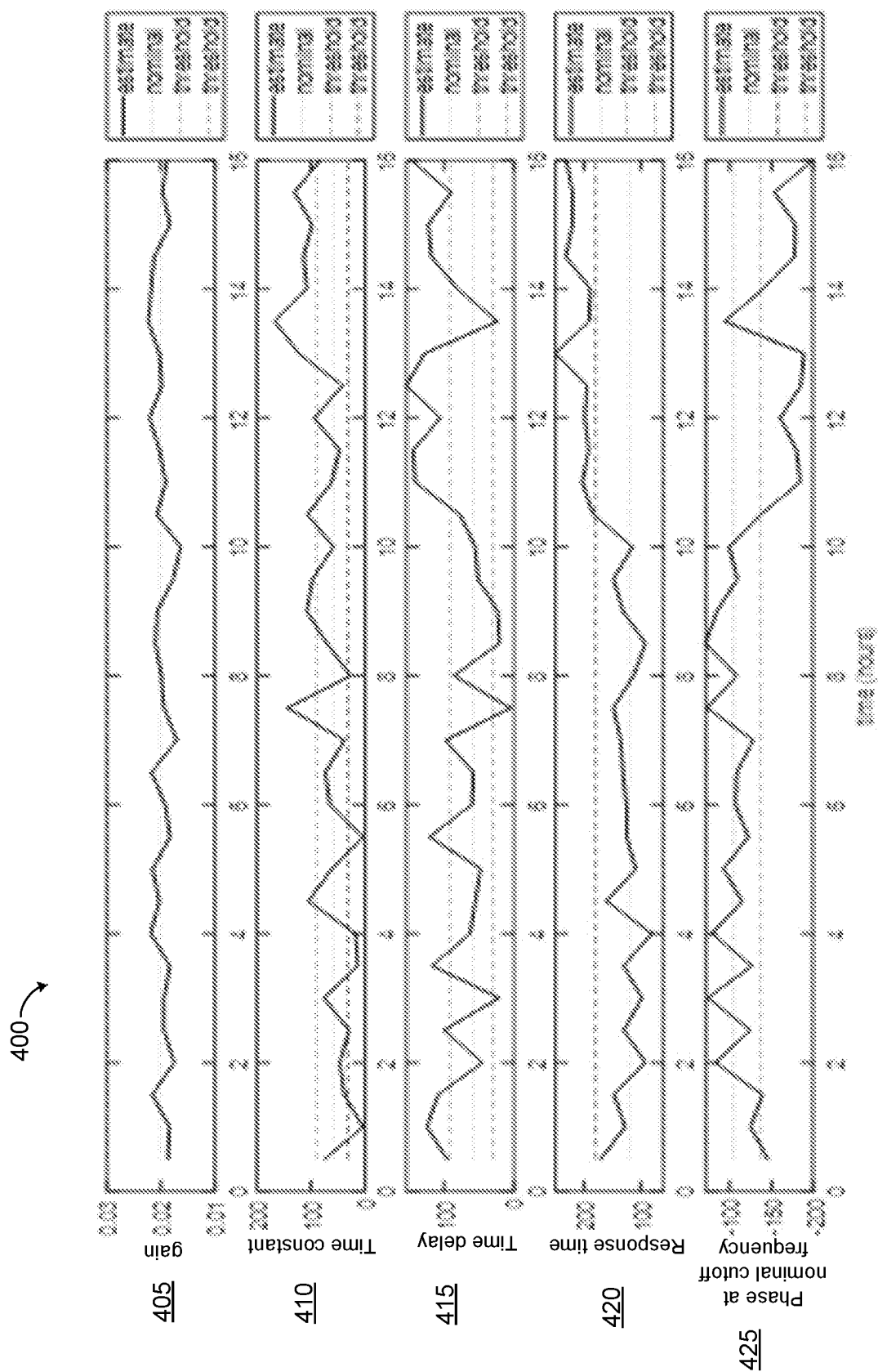
FIG. 4 illustrates a chart showing first order plus deadtime process model parameter estimates made periodically over a period of time during a process, according to this disclosure.

FIG. 4 illustrates a chart 400 showing first order plus deadtime process model parameter estimates made periodically over a period of time during a process, according to this disclosure. The gain, time constant, and time delay are all estimated over a period of time (here, sixteen hours) and plotted in plots 405, 410, and 415 respectively, along with the nominal model values and thresholds for change detection. In addition, the estimated process response time and the phase at the nominal cutoff frequency are also plotted in plots 420 and 425 respectively. Here the estimated response time plot 420 is the sum of the estimated time constant plot 410 and the estimated time delay plot 415, as determined using Technique 1 described above. The plot 415 showing the phase at the nominal cutoff frequency is obtained using Technique 2 described above.

In the data set shown in the chart 400, there is a change in the process (in particular, a change in the time constant to a value outside a threshold) starting at approximately 10 hours. The objective is to detect the change by examining the data in the different plots 405-425. The estimated gain plot 405 shows no estimates going beyond a threshold around the nominal value at any time, which is correct. The estimated time constant plot 410 shows significant swings in the estimate over time, with the estimate incorrectly going outside of the detection thresholds several times prior to the 10 hour mark (even though the actual value in within the thresholds prior to the 10 hour mark). Also, the estimates are incorrectly within the thresholds from 11 to 13 hours (even though the actual value of the time constant moves outside the threshold starting at approximately the 10 hour mark).

Thus, the time constant estimate data (as represented by the estimated time constant plot 410) is not reliable for monitoring for change detection. The time delay estimate data has similar problems.

However, the estimated response time plot 420 more clearly indicates the change that occurs at approximately 10 hours. The estimated response time plot 420 shows the estimates to be within the threshold until approximately the 10 hour mark. After the 10 hour mark, the plot 420 shows the estimates are outside of the threshold. This kind of clear pattern is what is desired for reliable change detection. The plot 425, indicating the phase at nominal cutoff frequency, shows the estimates moving outside of the threshold only a few times prior to the 10 hour mark. After the 10 hour mark the estimates are outside of the threshold except for the estimate at 13.5 hours. So, in this data set, Technique 2 (using the phase at the nominal cutoff frequency) is not quite as reliable for detecting change as Technique 1 (the process response time); however, Technique 2 is still better than separately monitoring the time constant and time delay.

This example shown in FIG. 4 demonstrates that when monitoring for changes in process behavior by examining process model parameter estimates over time, it is helpful to reduce the number of parameters to monitor. In many cases, reducing the dimension of the parameter space can improve the reliability of the monitoring. The techniques described herein provide different methods for summarizing the parameters associated with process dynamics (those other than the gain), either by the process response time, or by the phase at the cutoff frequency.

Figure 5:
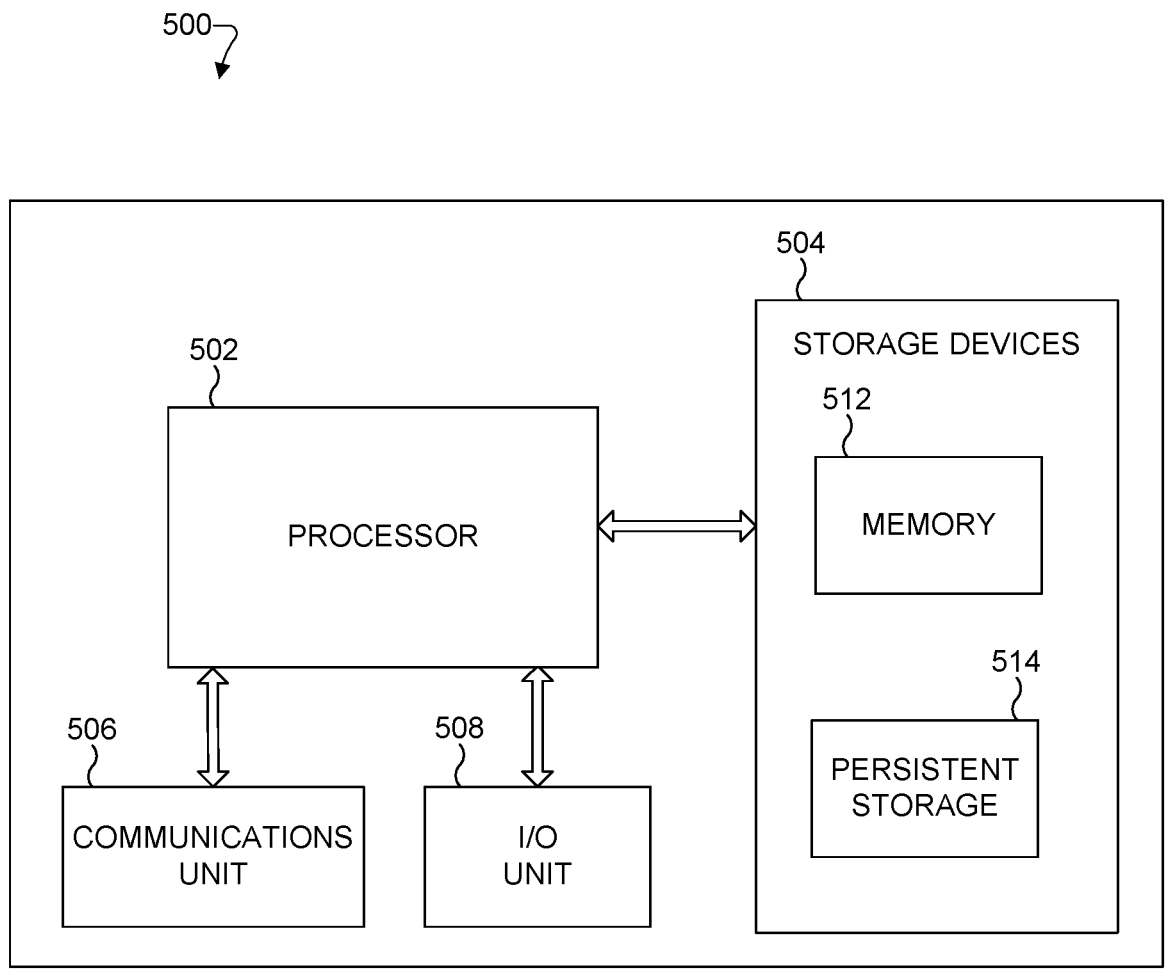
FIG. 5 illustrates an example device supporting a method for monitoring changes in process dynamic behavior by mapping parameters to a lower dimensional space, according to this disclosure.

FIG. 5 illustrates an example device 500 supporting a method for monitoring changes in process dynamic behavior by mapping parameters to a lower dimensional space, according to this disclosure. The device 500 could, for example, represent the operator consoles 110, the historian 114, the server 116, or a device in the computing cloud 118 of FIG. 1. However, these components could be implemented using any other suitable device or system, and the device 500 could be used in any other suitable system.

As shown in FIG. 5, the device 500 includes at least one processor 502, at least one storage device 504, at least one communications unit 506, and at least one input/output (I/O) unit 508. Each processor 502 can execute instructions, such as those implementing the processes and methods described above that may be loaded into a memory 512. Each processor 502 denotes any suitable processing device, such as one or more microprocessors, microcontrollers, digital signal processors, application specific integrated circuits (ASICs), field programmable gate arrays (FPGAs), or discrete circuitry.

The memory 512 and a persistent storage 514 are examples of storage devices 504, which represent any structure(s) capable of storing and facilitating retrieval of information (such as data, program code, and/or other suitable information on a temporary or permanent basis). The memory 512 may represent a random access memory or any other suitable volatile or non-volatile storage device(s). The persistent storage 514 may contain one or more components or devices supporting longer-term storage of data, such as a read only memory, hard drive, Flash memory, or optical disc. The memory 512 or the persistent storage 514 may be configured to store information and data associated with monitoring changes in process dynamic behavior by mapping parameters to a lower dimensional space.

The communications unit 506 supports communications with other systems or devices. For example, the communications unit 506 could include a network interface card or a wireless transceiver facilitating communications over a wired or wireless network (such as the network 108). The communications unit 506 may support communications through any suitable physical or wireless communication link(s).

The I/O unit 508 allows for input and output of data. For example, the I/O unit 508 provide a connection for user input through a keyboard, mouse, keypad, touchscreen, or other suitable input device. The I/O unit 508 may also send output to a display, printer, or other suitable output device.

Although FIG. 5 illustrates one example of a device 500 supporting a method for monitoring changes in process dynamic behavior by mapping parameters to a lower dimensional space, various changes may be made to FIG. 5. For example, various components in FIG. 5 could be combined, further subdivided, or omitted and additional components could be added according to particular needs. Also, computing devices can come in a wide variety of configurations, and FIG. 5 does not limit this disclosure to any particular configuration of computing device.

Figure 6:
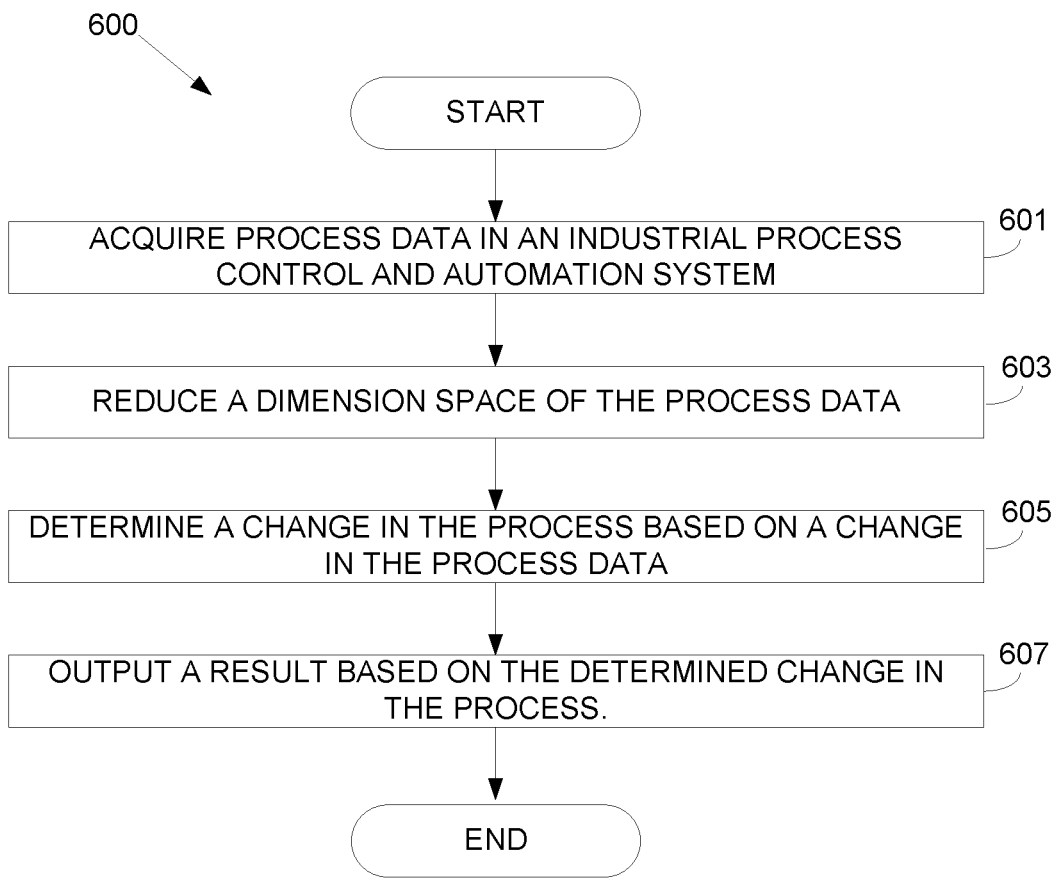
FIG. 6 illustrates an example method for monitoring changes in process dynamic behavior by mapping parameters to a lower dimensional space, according to this disclosure.

FIG. 6 illustrates an example method 600 for monitoring changes in process dynamic behavior by mapping parameters to a lower dimensional space, according to this disclosure. The method 600 could, for example, be used for monitoring process changes in an industrial process control and automation system, such as the system 100 of FIG. 1. In some embodiments, the method 600 could be performed by one or more components of the system 100, such as an operator station 110, a server 116, or a computing cloud 118. However, the method 600 could be used with any other suitable system. For ease of explanation, the method 600 will be described as being performed by a computing device, such as the device 500 of FIG. 5.

At step 601, the device acquires process data collected during performance of a process in an industrial process control and automation system. This could include, for example, the device acquiring process data from a historian. The process data may be output from one or more controllers in the industrial process control and automation system. In some embodiments, the process data is stored in the historian after the process data is output from the one or more controllers. In some embodiments, the data is acquired somewhat in real-time, in that batches of data are uploaded to the device every minute or every few seconds.

At step 603, the device reduces a dimension space of the process data by combining two or more parameters of the process data or examining a frequency response of the process data in some embodiments, the device reduces the dimension space of the process data by combining a time constant parameter and a time delay parameter into a response time parameter. In some embodiments, the device reduces the dimension space of the process data to a gain and a phase shift of the process data at a cut-off frequency.

At step 605, the device determines a change in the process based on a change in the process data in the reduced dimension space. In some embodiments, the device determines the change in the process by inputting the process data in the reduced dimension space into an algorithm and receiving an output of the algorithm indicating that the process data has exceeded a predetermined threshold.

At step 607, the device outputs a result based on the determined change in the process. In some embodiments, the result that is output comprises an alarm or warning to a user, where the alarm or warning indicates to the user to re-tune or calibrate a component of the industrial process control and automation system. In some embodiments, the result that is output comprises a signal or instruction transmitted by the device to a component of the industrial process control and automation system, where the signal or instruction is configured to automatically change a setting of the component.

Although FIG. 6 illustrates one example of a method 600 for monitoring changes in process dynamic behavior by mapping parameters to a lower dimensional space, various changes may be made to FIG. 6. For example, while shown as a series of steps, various steps shown in FIG. 6 could overlap, occur in parallel, occur in a different order, or occur multiple times. Moreover, some steps could be combined or removed, and additional steps could be added according to particular needs.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can to be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for monitoring changes in process dynamic behavior in an industrial process using a device including a processing device, a memory and a communication unit, the method comprising:
   acquiring, by the processing device, process data collected and stored in the memory of the device and from one or more controllers through a plurality of sensors or actuator associated with an industrial process control and automation system;
   reducing, by the processing device, a dimension space of the process data by combining two or more parameters of the process data or examining a frequency response of the process data, the dimension space of the process data is reduced by combining a time constant parameter and a time delay parameter into a response time parameter, wherein the response time parameter is the sum of the time constant parameter and the time delay parameter;
   determining, by the processing device, a change in a process based on a change in the process data in the reduced dimension space;
   outputting, by the communication unit of the device, a result based on the determined change in the process; and
   adjusting the industrial process control and automation system using the result to re-tune or calibrate a component of the industrial process control and automation system.

2. The method of claim 1, wherein the dimension space of the process data is reduced by reducing a higher order model to a response time parameter.

3. The method of claim 1, wherein the dimension space of the process data is reduced to a gain and a phase shift of the process data at a cut-off frequency.

4. The method of claim 1, wherein the process data is acquired from one or more controllers in the industrial process control and automation system.

5. The method of claim 1, wherein the change in the process is determined by inputting the process data in the reduced dimension space into an algorithm and receiving an output of the algorithm indicating that the process data has exceeded a predetermined threshold.

6. The method of claim 1, wherein the result that is output comprises an alarm or warning to a user, the alarm or warning indicating to the user to re-tune or calibrate a component of the industrial process control and automation system.

7. The method of claim 1, wherein the result that is output comprises a signal or instruction transmitted to a component of the industrial process control and automation system, wherein the signal or instruction is configured to automatically change a setting of the component.

8. The method of claim 1, wherein the method is performed by a cloud-based computing device.

9. An apparatus for monitoring changes in the dynamic behavior of an industrial process comprising:
at least one processing device, a memory and a communication unit configured to:
acquire process data collected and stored in the memory of the apparatus and from one or more controllers through a plurality of sensors or actuator associated with an industrial process control and automation system;
reduce a dimension space of the process data by combining two or more parameters of the process data or examining a frequency response of the process data, the dimension space of the process data is reduced by combining a time constant parameter and a time delay parameter into a response time parameter, wherein the response time parameter is the sum of the time constant parameter and the time delay parameter;
determine a change in a process based on a change in the process data in the reduced dimension space;
output, by the communication unit, a result based on the determined change in the process; and
adjust the industrial process control and automation system using the result to re-tune or calibrate a component of the industrial process and automation system.

10. The apparatus of claim 9, wherein to reduce the dimension space of the process data, the at least one processing device is configured to reduce a higher order model to a response time parameter.

11. The apparatus of claim 9, wherein to reduce the dimension space of the process data, the at least one processing device is configured to reduce the dimension space to a gain and a phase shift of the process data at a cut-off frequency.

12. The apparatus of claim 9, wherein the at least one processing device is configured to acquire the process data from one or more controllers in the industrial process control and automation system.

13. The apparatus of claim 9, wherein to determine the change in the process, the at least one processing device is configured to input the process data in the reduced dimension space into an algorithm and receive an output of the algorithm indicating that the process data has exceeded a predetermined threshold.

14. The apparatus of claim 9, wherein to output the result, the at least one processing device is configured to output an alarm or warning to a user, the alarm or warning indicating to the user to re-tune or calibrate a component of the industrial process control and automation system.

15. The apparatus of claim 9, wherein to output the result, the at least one processing device is configured to transmit a signal or instruction to a component of the industrial process control and automation system, wherein the signal or instruction is configured to automatically change a setting of the component.

16. The apparatus of claim 9, wherein the apparatus is comprised in a cloud-based computing device.

17. A non-transitory computer readable medium containing instructions that when executed cause at least one processing device to monitor changes in process dynamic behavior of an industrial process using a device, the device further including a memory and a communication unit:
acquire process data collected and stored in the memory of the device and from one or more controllers through a plurality of sensors or actuator associated with an industrial process control and automation system;
reduce a dimension space of the process data by combining two or more parameters of the process data or examining a frequency response of the process data, the dimension space of the process data is reduced by combining a time constant parameter and a time delay parameter into a response time parameter, wherein the response time parameter is the sum of the time constant parameter and the time delay parameter;
determine a change in a process based on a change in the process data in the reduced dimension space;
output, by the communication unit, a result based on the determined change in the process; and
adjust the industrial process control and automation system using the result to retune or calibrate a component of the industrial process and automation system.

* * * * *